United States Patent
Bika et al.

(10) Patent No.: US 10,589,581 B2
(45) Date of Patent: Mar. 17, 2020

(54) SMART TRAILER COUPLER SYSTEM

(71) Applicant: GM Global Technology Operations LLC, Detroit, MI (US)

(72) Inventors: Anil Bika, Rochester Hills, MI (US); Thomas R. Brown, Shelby Township, MI (US); Daniel Demitrish, Oxford, MI (US); Anthony L. Smith, Troy, MI (US); Michelle H. Wiebenga, Farmington Hills, MI (US); Grant L. Meade, Whitby (CA); Norman J. Weigert, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 197 days.

(21) Appl. No.: 15/724,564

(22) Filed: Oct. 4, 2017

(65) Prior Publication Data

US 2019/0100064 A1  Apr. 4, 2019

(51) Int. Cl.
*B60D 1/06* (2006.01)
*B60D 1/28* (2006.01)
*B60D 1/62* (2006.01)

(52) U.S. Cl.
CPC .......... *B60D 1/06* (2013.01); *B60D 1/28* (2013.01); *B60D 1/62* (2013.01)

(58) Field of Classification Search
CPC ... B60D 3/00; B60D 1/62; B60D 1/06; B60D 1/24; B60D 1/36; B60D 1/48; B60D 1/248

USPC .......................................................... 280/477
See application file for complete search history.

(56) References Cited

U.S. PATENT DOCUMENTS

| | | | | |
|---|---|---|---|---|
| 4,319,766 A * | 3/1982 | Corteg | ............... | B60D 1/248 280/432 |
| 6,178,650 B1 * | 1/2001 | Thibodeaux | ............ | B60D 1/36 280/477 |
| 6,722,684 B1 * | 4/2004 | McAllister | ............... | B60D 1/06 177/146 |
| 2012/0130589 A1 * | 5/2012 | Riehle | ............... | B60D 1/01 701/36 |
| 2012/0217726 A1 * | 8/2012 | Vortmeyer | ............... | B60D 1/06 280/511 |
| 2014/0110918 A1 * | 4/2014 | McCoy | ............... | B60D 1/248 280/511 |
| 2014/0327229 A1 * | 11/2014 | Scharf | ............... | B60D 1/248 280/511 |
| 2015/0069737 A1 * | 3/2015 | McAllister | ............... | B60D 1/62 280/511 |
| 2017/0015163 A1 * | 1/2017 | Sielhorst | ............... | B60D 1/06 |
| 2017/0334256 A1 * | 11/2017 | Scheips | ............... | B60D 1/06 |

* cited by examiner

*Primary Examiner* — Tony H Winner
(74) *Attorney, Agent, or Firm* — Cantor Colburn LLP

(57) ABSTRACT

A smart trailer coupler system includes a ball mount connectable to a vehicle, a hitch ball mechanically connected to the ball mount, a coupler selectively connectable to the hitch ball, and at least one sensor mounted to one of the ball mount, the hitch ball and the coupler. The at least one sensor detects a size compatibility between the coupler and the hitch ball. A signal system is operatively connected to the at least one sensor. The signal system provides at least one of a visual alert and an audible alert of the size compatibility between the hitch ball and the coupler.

20 Claims, 5 Drawing Sheets

SMART TRAILER COUPLER SYSTEM

The subject disclosure relates to the art of vehicle trailer coupler systems and, more particularly, to a smart trailer coupler system for a vehicle.

On occasion, it may be desirable to tow a trailer or other object behind a vehicle. Typically, a towing vehicle includes a ball hitch that is received by a coupler on a towed vehicle, such as a trailer. When making a connection, it is desirable that the ball and coupler are matched. Specifically, couplers are designed to receive a ball having a particular diameter. It is therefore desirable that, when making a connection between the towing vehicle and the towed vehicle, that the ball be of a size that is compatible with the coupler.

A ball that is too large may not properly seat in a coupler designed for a smaller ball. Accordingly, connecting a towed vehicle to an oversized ball may lead to poor connection issues. Connecting a towed vehicle to an undersized ball may lead to connection issues such as an inadvertent decoupling during travel. That is, an undersized ball may not be properly captured by a coupler and, under certain circumstances, may inadvertently become decoupled. Even a small mismatch in size may lead to an inadvertent or undesirable decoupling. Accordingly, it is desirable to provide a system that may alert a user to a size mismatch between a coupler and a hitch ball.

SUMMARY

In accordance with an aspect of an exemplary embodiment, a smart trailer coupler system includes a ball mount connectable to a vehicle, a hitch ball mechanically connected to the ball mount, a coupler selectively connectable to the hitch ball, and at least one sensor mounted to one of the ball mount, the hitch ball and the coupler. The at least one sensor detects a size compatibility between the coupler and the hitch ball. A signal system is operatively connected to the at least one sensor. The signal system provides at least one of a visual alert and an audible alert of the size compatibility between the hitch ball and the coupler.

In addition to one or more of the features described above or below, or as an alternative, further embodiments could include wherein the at least one sensor comprises a first sensor and a second sensor mounted to the hitch ball.

In addition to one or more of the features described above or below, or as an alternative, further embodiments could include wherein each of the first and second sensors comprises one of a proximity sensor and a spring loaded sensor.

In addition to one or more of the features described above or below, or as an alternative, further embodiments could include wherein the first sensor is positioned substantially opposite the second sensor on the hitch ball.

In addition to one or more of the features described above or below, or as an alternative, further embodiments could include wherein the at least one sensor comprises a first sensor and a second sensor mounted to the coupler.

In addition to one or more of the features described above or below, or as an alternative, further embodiments could include wherein each of the first and second sensors comprises a proximity sensor, the first sensor being arranged opposite the second sensor on the coupler.

In addition to one or more of the features described above or below, or as an alternative, further embodiments could include wherein the at least one sensor is mounted to the ball mount.

In addition to one or more of the features described above or below, or as an alternative, further embodiments could include wherein the at least one sensor comprises a first proximity sensor and a second proximity sensor.

In addition to one or more of the features described above or below, or as an alternative, further embodiments could include wherein the signal system includes one or more indicator lights that provide a visual indication of the size compatibility between the hitch ball and the coupler.

In addition to one or more of the features described above or below, or as an alternative, further embodiments could include wherein one of the hitch ball and the coupler includes a radio frequency identification (RFID) chip and the other of the hitch ball and the coupler includes an RFID reader.

In addition to one or more of the features described above or below, or as an alternative, further embodiments could include wherein the RFID chip is mounted to the hitch ball.

In accordance with another aspect of an exemplary embodiment, a vehicle includes a body defining an occupant compartment, and a smart trailer coupler system including a ball mount connected to the vehicle, a hitch ball mechanically connected to the ball mount, and at least one sensor mounted to one of the ball mount, and the hitch ball. The at least one sensor detects a size compatibility of the hitch ball and a coupler. A signal system is operatively connected to the at least one sensor. The signal system provides at least one of a visual alert and an audible alert of the size compatibility between the hitch ball and the coupler.

In addition to one or more of the features described above or below, or as an alternative, further embodiments could include wherein the at least one sensor comprises a first sensor and a second sensor mounted to the hitch ball.

In addition to one or more of the features described above or below, or as an alternative, further embodiments could include wherein each of the first and second sensors comprises one of a proximity sensor and a spring loaded sensor.

In addition to one or more of the features described above or below, or as an alternative, further embodiments could include wherein the first sensor is positioned substantially opposite the second sensor on the hitch ball.

In addition to one or more of the features described above or below, or as an alternative, further embodiments could include wherein the at least one sensor is mounted to the ball mount.

In addition to one or more of the features described above or below, or as an alternative, further embodiments could include wherein the at least one sensor comprises a first proximity sensor and a second proximity sensor.

In addition to one or more of the features described above or below, or as an alternative, further embodiments could include wherein the signal system includes one or more indicator lights that provide a visual indication of the size compatibility between the hitch ball and the coupler.

In addition to one or more of the features described above or below, or as an alternative, further embodiments could include wherein one of the hitch ball and the coupler includes a radio frequency identification (RFID) chip and the other of the hitch ball and the coupler includes an RFID reader.

In addition to one or more of the features described above or below, or as an alternative, further embodiments could include wherein the RFID chip is mounted to the hitch ball.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
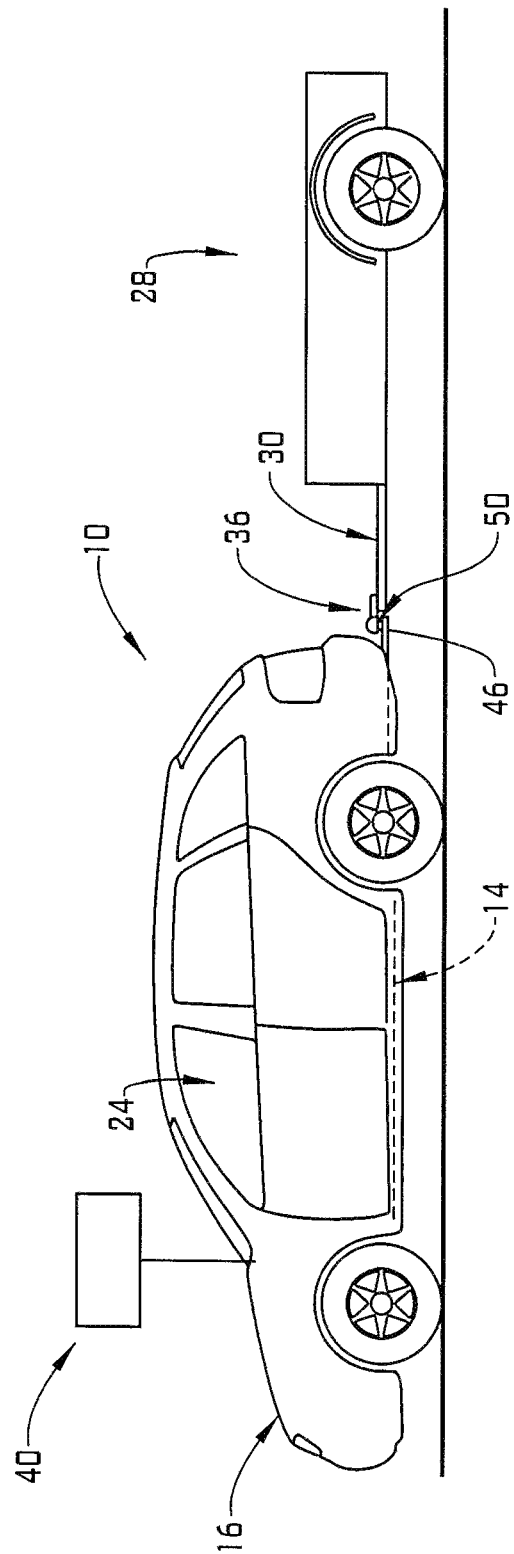
FIG. 1 depicts a vehicle including a smart trailer coupler system, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with an aspect of an exemplary embodiment, is indicated generally at 10 at FIG. 1. Vehicle 10 may include a frame 14 that supports a body 16 which, defines in part, an occupant compartment 24. Of course, it should be understood that vehicle 10 may possess a unibody construction. Vehicle 10 is shown connected to a trailer 28. Specifically, trailer 28 includes a trailer tongue 30 that is mechanically connected to vehicle 10 through a smart trailer coupler system 36 having a signal system 40. Smart trailer coupler system 36 provides a visual indication and/or an audible indication of a proper connection between vehicle 10 and trailer 28 as will be described herein.

Figure 2:
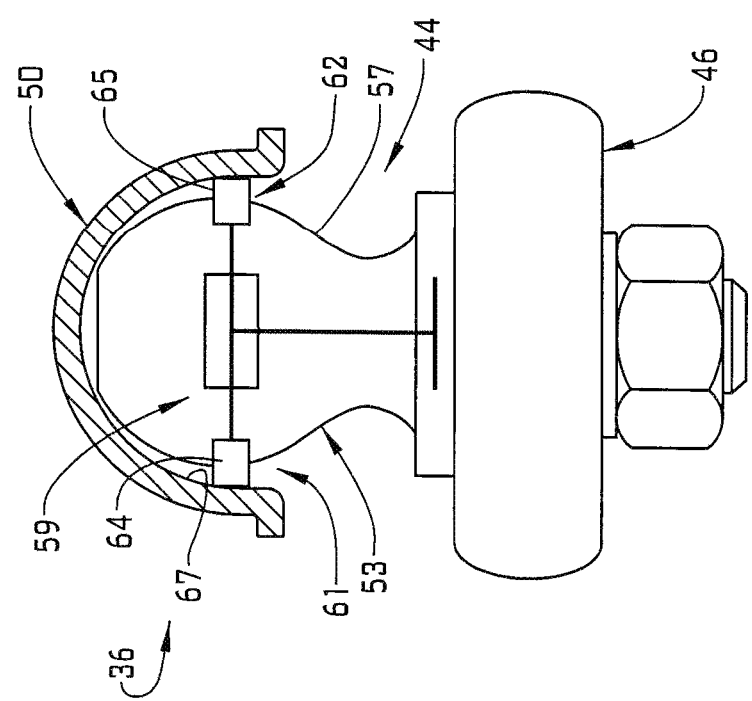
FIG. 2 depicts a hitch ball of the smart trailer coupler system, in accordance with an aspect of an exemplary embodiment.

Referring to FIG. 2, and with continued reference to FIG. 1, smart trailer coupler system 36 may include a hitch ball 44 that is mechanically connected to vehicle 10 through a ball mount 46 that may be connected to frame 14. Ball mount 46 may be connected to body 16 in a unibody vehicle. Hitch ball 44 may also be electrically connected to vehicle 10 and signal system 40. Hitch ball 44 is connected to trailer tongue 30 through a coupler 50. Hitch ball 44 and coupler 50 should be sized matched to ensure a proper and robust connection. Smart trailer coupler system 36 provides an alert to users through signal system 40 that a size compatibility or proper seating condition exists between hitch ball 44 and coupler 50 as will be discussed herein. The alert may take the form of a visual alert and/or an audible alert. The alert may be provided on a vehicle display or communicated to a designated smart device such as a smart phone, a tablet, a laptop or the like.

In the exemplary embodiment shown, hitch ball 44 includes a rounded profile 53 having a selected diameter. Rounded profile 53 includes an outer surface 57 and a sensor system 59. Sensor system 59 includes a first sensor 61 and a second sensor 62 arranged about 180° from first sensor 61 on outer surface 57. First sensor 61 may take the form of a first spring loaded sensor 64 and second sensor 62 may take the form of a second spring loaded sensor 65. First and second sensors 61, 62 detect a relative distance from outer surface 57 of hitch ball 44 to an inner surface 67 of coupler 50. If the sensed distance falls within a selected range, signal system 40 indicates a proper seating condition exists. If the sensed distance does not fall within the selected range, signal system 40 indicates that a size mismatch may exist e.g., coupler 50 may not be fully seated to the hitch ball 44.

Figure 3:
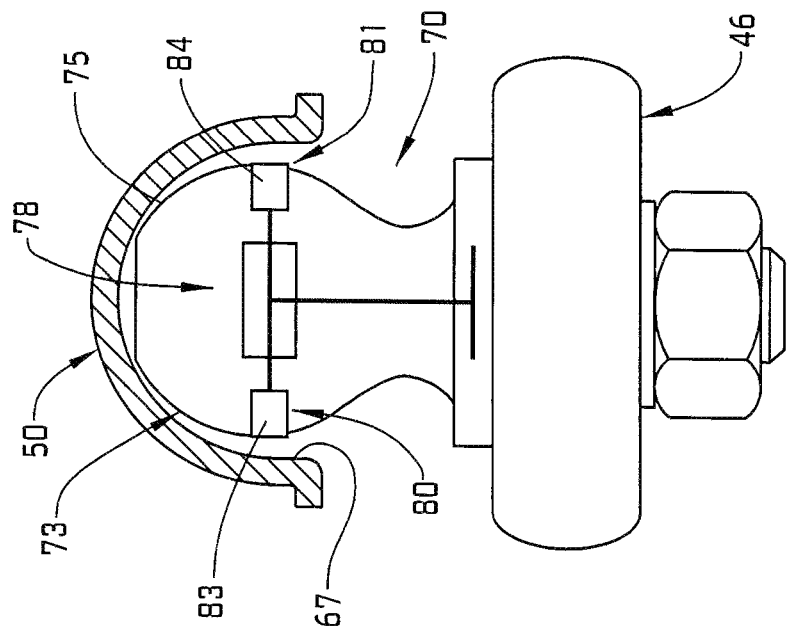
FIG. 3 depicts a hitch ball of the smart trailer coupler system, in accordance with another aspect of an exemplary embodiment

Referring to FIG. 3, wherein like reference numbers represent corresponding parts in the respective views, in describing a hitch ball 70 in accordance with another aspect of an exemplary embodiment. Hitch ball 70 is shown to include a rounded profile 73 having a selected diameter. Rounded profile 73 includes an outer surface 75 and a sensor system 78. Sensor system 78 includes a first sensor 80 and a second sensor 81 arranged about 180° from first sensor 80 on outer surface 75. First sensor 80 may take the form of a first proximity sensor 83 and second sensor 81 may take the form of a second proximity sensor 84. First and second sensors 80, 81 detect a relative distance from outer surface 75 of hitch ball 70 to inner surface 67 of coupler 50. If the sensed distance falls within a selected range, signal system 40 indicates a proper seating condition exists. If the sensed distance does not fall within the selected range, signal system 40 indicates that a size mismatch may exist e.g., coupler 50 may not be fully seated to the hitch ball 70.

Figure 4:
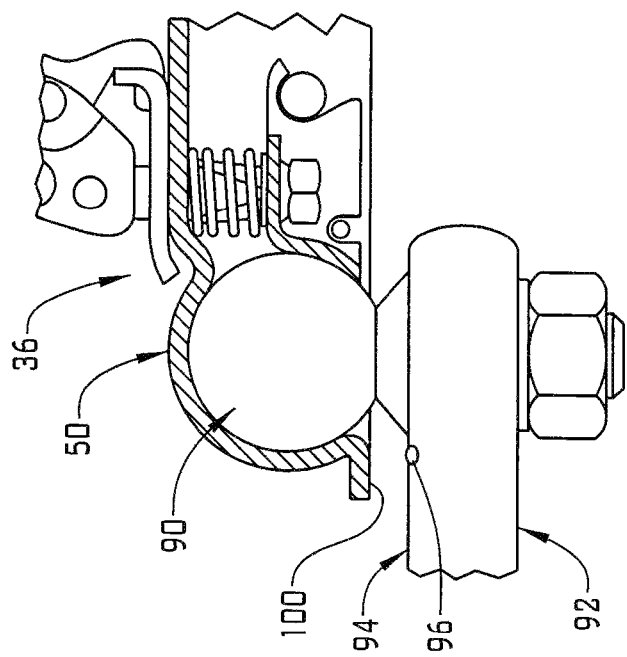
FIG. 4 depicts the smart trailer coupler system, in accordance with another aspect of an exemplary embodiment.

Referring now to FIG. 4 wherein like reference numbers represent corresponding parts in the respective views, in describing a hitch ball 90 in accordance with yet another aspect of an exemplary embodiment. Hitch ball 90 is shown connected to a ball mount 92 having an outer surface 94. A sensor 96 is arranged in outer surface 94 and directed upwardly toward coupler 50. More specifically, sensor 96 is directed upwardly toward a coupler surface 100. Sensor 96 determines a distance between outer surface 94 and coupler surface 100. If the sensed distance falls within a selected range, signal system 40 indicates a proper seating condition exists. If the sensed distance does not fall within the selected range, signal system 40 indicates that a size mismatch may exist e.g., coupler 50 may not be fully seated to the hitch ball 90.

Figure 5:
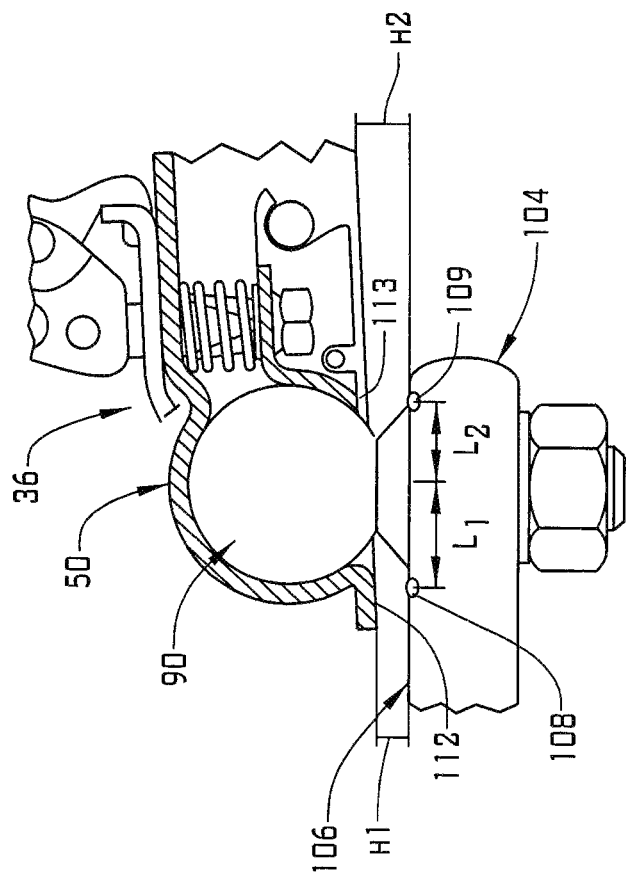
FIG. 5 depicts the smart trailer coupler system, in accordance with still another aspect of an exemplary embodiment.

Referring now to FIG. 5, and with continued reference to FIG. 1, hitch ball 90 is shown connected to a ball mount 104 having an outer surface 106. A first sensor 108 and a second sensor 109 are arranged in outer surface 106 and directed upwardly toward coupler 50. Second sensor 109 is arranged about 180° aft of first sensor 108. First sensor 108 is directed upwardly toward a first coupler surface 112 and second sensor 109 is directed upwardly toward a second coupler surface 113. First and second sensors 108 and 109 determine a distance between outer surface 106 and corresponding ones of first and second coupler surfaces 112 and 113. With the use of first and second sensors 108 and 109, smart trailer coupler system 36 may account for an angular mismatch between vehicle 10 and trailer 28.

For example, smart trailer coupler system 36 may determine a mean height ($\bar{h}$) based on the formula:

$$\bar{h} = L_1/(L_1+L_2)*(h_2-h_1)+h_1$$

If the mean height falls within a selected range, signal system 40 indicates a proper seating condition exists. If the mean height does not fall within the selected range, signal system 40 indicates that a size mismatch may exist e.g., coupler 50 may not be fully seated to the hitch ball 90.

Figure 6:
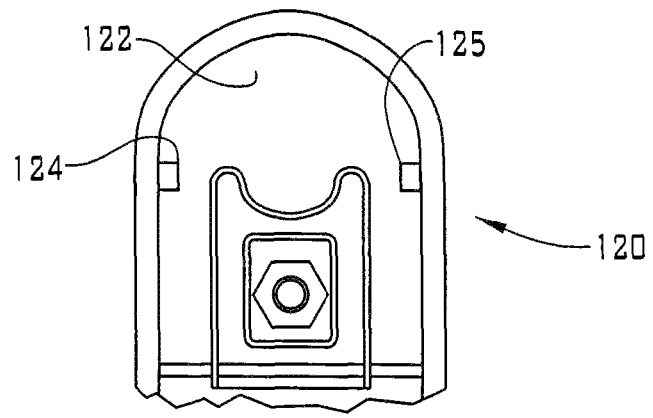
FIG. 6 depicts a coupler of the smart trailer coupler system, in accordance with still yet another aspect of an exemplary embodiment.

Reference will now follow to FIG. 6 in describing a coupler 120 in accordance with an exemplary aspect. Coupler 120 may include an inner surface 122 having a first sensor 124 and a second sensor 125. First and second sensors 124 and 125 are arranged to detect a distance to opposing sides of a hitch ball (not shown). If the sensed distance falls within a selected threshold, signal system 40 indicates a proper seating condition exists. If the sensed distance does not meet the selected threshold, signal system 40 indicates that a size mismatch may exist, e.g., coupler 120 may not be fully seated to the hitch ball.

Figure 7:
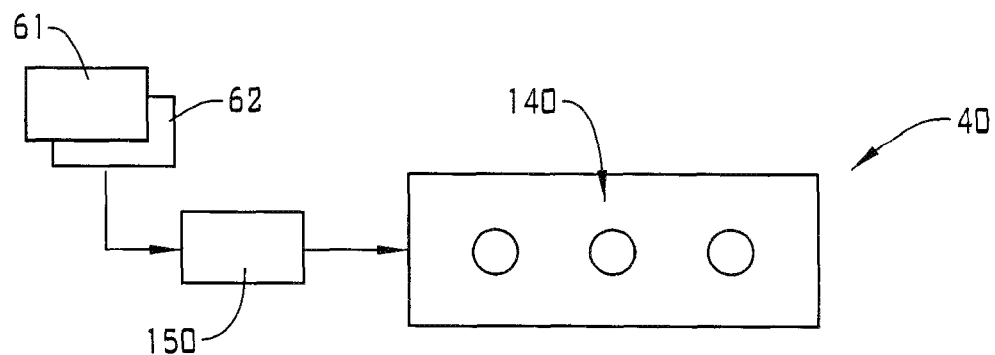
FIG. 7 depicts a signal system of the smart trailer coupler system, in accordance with an aspect of an exemplary embodiment.

Reference will now follow to FIG. 7 in describing signal system 40 in accordance with an aspect of an exemplary embodiment. Signal system 40 includes a plurality of indicator lights indicated generally at 140 that selectively illuminate to indicate whether a proper seating condition exists or that a size mismatch may exist. Signal system 40 is connected to, for example, first and second sensors 61 and 62, FIG. 2. Of course, it should be understood that the particular type and location of the sensors may vary.

Sensors 61, 62, are coupled to signal system 40 through a processor module 150 that evaluates sensor data and determines which of the plurality of indicator lights 140 to illuminate. For example, a left most light may illuminate once coupler and hitch ball are connected. If each of the other plurality of indicator lights 140 are illuminated, a proper size match may exist. If one or the other or both of the other indictor lights 140 are not illuminated, a size mismatch may exist. It should be understood that the particular location of signal system 40 may vary. For example, signal system 40 may be arranged at ball mount 46, trailer tongue 30 or as part of a vehicle information system. It should also be understood that smart trailer coupler system 36 may receive power from directly from vehicle 10, through an electrical connection to trailer 28, or through a dedicated power source such as a battery. Smart trailer coupler system 36 may also communicate with a smart phone providing alert messages to the user.

Figure 8:
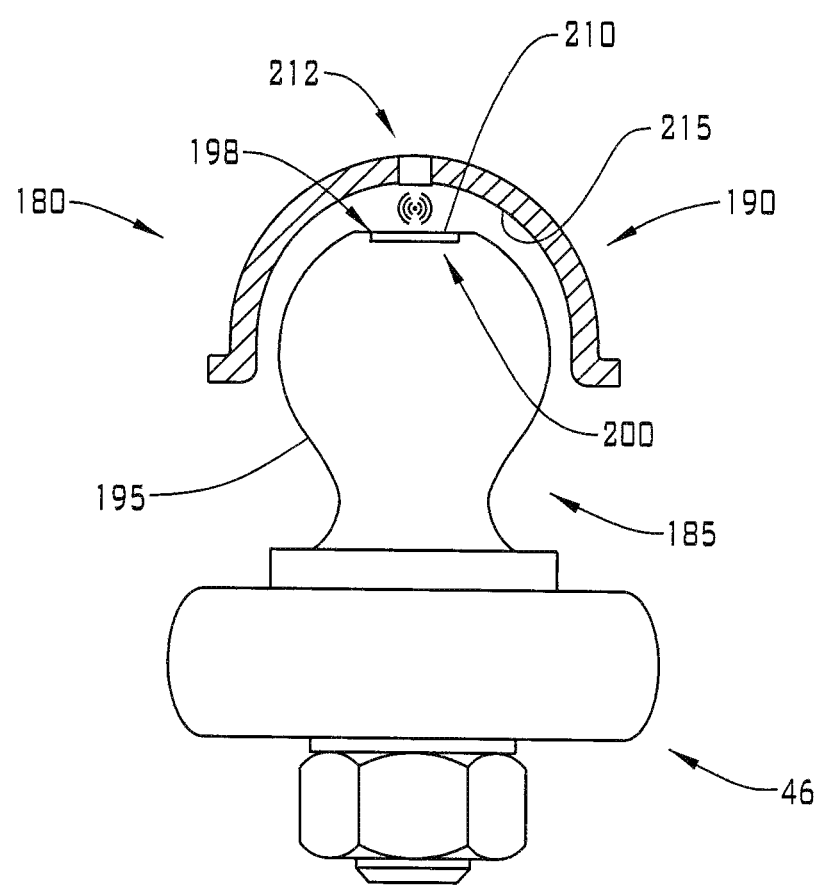
FIG. 8 depicts a smart trailer coupler system, in accordance with yet still another aspect of an exemplary embodiment.

Reference will now follow to FIG. 8, wherein like reference numbers represent corresponding parts in the respective views, in describing a smart trailer coupler system 180 in accordance with another aspect of an exemplary embodiment. Smart trailer coupler system 180 includes a hitch ball 185 connected to ball mount 46. A coupler 190 is connected to hitch ball 185. Hitch ball 185 includes an outer surface 195 having an upper portion 198. Upper portion 198 may be substantially flat. A radio frequency identification (RFID) chip 200 is mounted to upper portion 198. RFID chip 200 may be mounted in a recess (not separately labeled) formed in upper portion 198 and covered by a protective coating 210. Protective coating 210 may also retain RFID chip 200 to hitch ball 185. Protective coating 210 may take on a variety of forms including polymer adhesives such as epoxy, solid sheet material, or the like.

Coupler 190 includes an RFID reader 212 operatively coupled to signal system 40. RFID reader 212 is positioned to scan RFID chip 200 when coupler 190 is connected to hitch ball 185. RFID reader 212 may determine a distance between upper portion 198 and an inner surface 215 of coupler 190. If the sensed distance "d" falls within a selected threshold, signal system 40 indicates a proper seating condition exists. If the sensed distance does not meet the selected threshold, signal system 40 indicates that coupler 190 may not be fully seated to hitch ball 185.

RFID chip 200 may contain data that may include hitch ball diameter and coupler size information. RFID reader 212 may read the data stored in RFID chip 200 and compare with known parameters, e.g., coupler data, to determine mating compatibility. If a compatible determination is sensed, signal system 40 indicates that the correct ball is in use for the coupler being attached. If an incompatible determination is sensed, signal system 40 indicates that the incorrect ball is in use for the coupler being attached.

The locations of RFID chip 200 and RFID reader 212 may also be reversed such that RFID reader 212 is located within hitch ball 185 and RFID chip 200 is located in coupler 190. Additionally, a reader (not shown) may be positioned to read RFID tags associated with both the hitch ball and the coupler. A determination may then be made based on data stored in each RFID tag whether a match exists. Further, the RFID reader may determine the distance "d" between upper portion 198 and inner surface 215 of coupler 190. If the sensed distance "d" falls within a selected threshold, signal system 40 indicates appropriate seating condition of the coupler to the ball exists. If the sensed distance "d" does not meet the selected threshold, signal system 40 indicates that there is not a proper seating condition of the coupler to the ball.

The terms "about" and "substantially" are intended to include the degree of error associated with measurement of the particular quantity based upon the equipment available at the time of filing the application. For example, "about" and "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A trailer coupler system comprising:
a ball mount connectable to a vehicle;
a hitch ball mechanically connected to the ball mount;
a coupler selectively connectable to the hitch ball;
at least one sensor mounted to one of the ball mount, the hitch ball and the coupler, the at least one sensor detecting a size compatibility between the coupler and the hitch ball; and
a signal system operatively connected to the at least one sensor, the signal system providing at least one of a visual alert and an audible alert of the size compatibility between the hitch ball and the coupler.

2. The trailer coupler system according to claim 1, wherein the at least one sensor comprises a first sensor and a second sensor mounted to the hitch ball.

3. The trailer coupler system according to claim 2, wherein each of the first and second sensors comprises one of a proximity sensor and a spring loaded sensor.

4. The trailer coupler system according to claim 2, wherein the first sensor is positioned substantially opposite the second sensor on the hitch ball.

5. The trailer coupler system according to claim 1, wherein the at least one sensor comprises a first sensor and a second sensor mounted to the coupler.

6. The trailer coupler system according to claim 5, wherein each of the first and second sensors comprises a proximity sensor, the first sensor being arranged opposite the second sensor on the coupler.

7. The trailer coupler system according to claim 1, wherein the at least one sensor is mounted to the ball mount.

8. The trailer coupler system according to claim 7, wherein the at least one sensor comprises a first proximity sensor and a second proximity sensor.

9. The trailer coupler system according to claim 1, wherein the signal system includes one or more indicator lights that provide a visual indication of the size compatibility between the hitch ball and the coupler.

10. The trailer coupler system according to claim 1, wherein one of the hitch ball and the coupler includes a radio frequency identification (RFID) chip and the other of the hitch ball and the coupler includes an RFID reader.

11. The trailer coupler system according to claim 10, wherein the RFID chip is mounted to the hitch ball.

12. A vehicle comprising:
a body; and
a trailer coupler system comprising:
   a ball mount connected to the vehicle;
   a hitch ball mechanically connected to the ball mount;
   at least one sensor mounted to one of the ball mount, and the hitch ball, the at least one sensor detecting a size compatibility of the hitch ball and a coupler; and
   a signal system operatively connected to the at least one sensor, the signal system providing at least one of a visual alert and an audible alert of the size compatibility between the hitch ball and the coupler.

13. The vehicle according to claim 12, wherein the at least one sensor comprises a first sensor and a second sensor mounted to the hitch ball.

14. The vehicle according to claim 13, wherein each of the first and second sensors comprises one of a proximity sensor and a spring loaded sensor.

15. The vehicle according to claim 13, wherein the first sensor is positioned substantially opposite the second sensor on the hitch ball.

16. The vehicle according to claim 12, wherein the at least one sensor is mounted to the ball mount.

17. The vehicle according to claim 16, wherein the at least one sensor comprises a first proximity sensor and a second proximity sensor.

18. The vehicle according to claim 12, wherein the signal system includes one or more indicator lights that provide a visual indication of the size compatibility between the hitch ball and the coupler.

19. The vehicle according to claim 12, wherein one of the hitch ball and the coupler includes a radio frequency identification (RFID) chip and the other of the hitch ball and the coupler includes an RFID reader.

20. The vehicle according to claim 19, wherein the RFID chip is mounted to the hitch ball.

* * * * *